Feb. 13, 1968   E. L. BOLIN ETAL   3,368,795
COMPOSITE ROTOR BLADE HAVING HIGH MODAL FREQUENCIES
Filed July 12, 1967
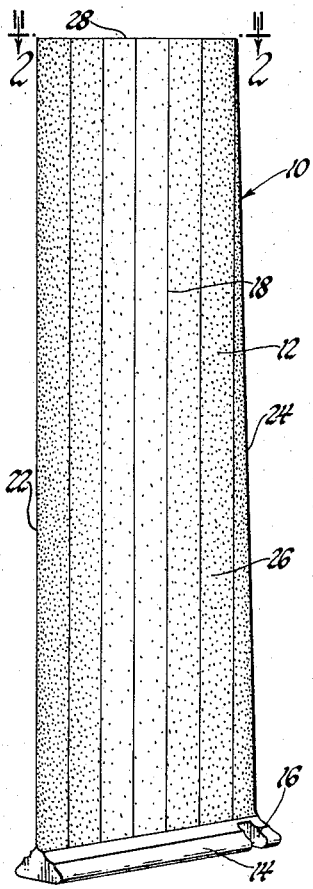
Fig. 1
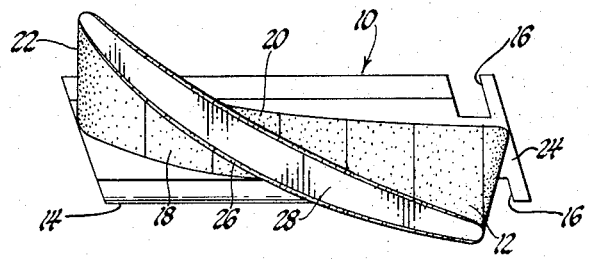
Fig. 2
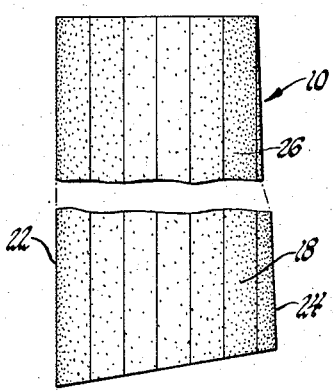
Fig. 3
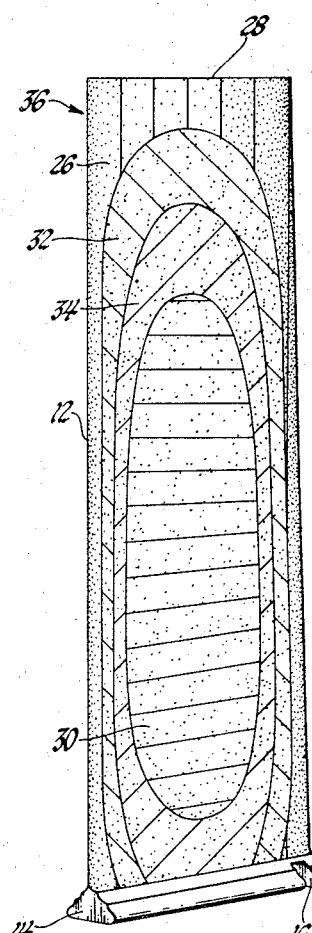
Fig. 7
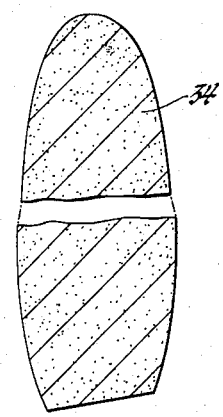
Fig. 5
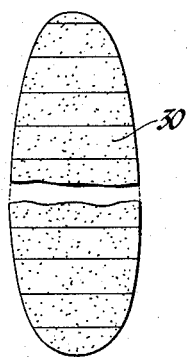
Fig. 6
Fig. 4
INVENTORS
Edward L. Bolin, &
Jack T. Edwards
George A. Growe
ATTORNEY United States Patent Office 3,368,795
Patented Feb. 13, 1968

3,368,795
COMPOSITE ROTOR BLADE HAVING HIGH
MODAL FREQUENCIES
Edward L. Bolin and Jack T. Edwards, Indianapolis, Ind., assignors to General Motors Corporation, Detroit, Mich., a corporation of Delaware
Filed July 12, 1967, Ser. No. 652,749
5 Claims. (Cl. 253—77)

ABSTRACT OF THE DISCLOSURE

A metallic rotor blade having one or more thin stiffening coating layers of parallel high modules of elasticity filaments bonded together in side-by-side relationship with a suitable thermosetting synthetic resin molded onto each of its fluid directing surfaces displays increased modal frequencies and improved damping characteristics so as to facilitate increased rotary machine performance requirements without experiencing destructive blade flutter.

This invention relates to compressor rotor blades, and like rotary machinery components, that are subjected to cyclical forces which excite vibrations in the blade member, and to a method of making the same. More specifically, this invention relates to a novel composite blade structure wherein a basis metal blade member is stiffened by one or more thin surface coating layers of parallel high modulus filaments which are bonded to each other and to the blade by means of a suitable thermosetting synthetic resin.

In the design of high performance and heavy duty rotating machinery, such as for example gas turbine lift engine compressors, the structural components require properties of low weight, high strength, and high modulus of elasticity so as to perform as designed without mechanical failure. With respect to the requirement of low weight, aluminum, titanium and even glass fiber reinforced synthetic resin have been used to fabricate compressor components such as the rotor blades. However, for many compressor applications, these materials do not have a sufficiently high modulus of elasticity and they fail mechanically. The mode of failure has been traced to induced vibrations, wherein the frequency of the exciting forces is close to a natural vibration frequency of the blade, either in the fundamental or torsional vibration modes. For most purposes, the physical strength of the blade metal is adequate, but with exciting forces of these certain frequencies the blade can be caused to "shake itself apart." To some extent, the blades might be "beefed up" or redesigned so that their stiffness is increased. However, this is not always possible because of weight and space limitations. Moreover, even without these limitations, the aerodynamic and thermodynamic requirements of the structure may be such that with present materials of construction, the blade cannot be sufficiently dampened or stiffened and under suitable operating conditions it flutters and fails.

It is an object of the present invention to provide a novel composite rotor blade design wherein a metallic blade member is stiffened by the application of a material having a relatively high modulus of elasticity to each of its fluid directing faces for the purposes of increasing a modal vibration frequency and/or of improving a damping characteristic of the composite structure.

It is another object of the present invention to provide a composite rotor blade structure wherein a metallic blade member is stiffened by a high modulus filament-thermosetting resin composite laminate coating on each of its fluid directing faces such that a modal frequency of the blade is increased and/or the damping of the blade is improved beyond that which could be obtained by increasing the thickness of the metallic portion of the blade an amount equivalent to the laminate coating.

It is a further object of the present invention to provide a compressor blade design wherein a metallic blade member may be selectively stiffened with a high modulus filament-thermosetting resin laminate so as to increase a modal vibration frequency of the structure in a particular vibration mode, as for example in the bending mode or the torsional mode, or to selectively increase a damping characteristic of the structure.

It is a still further object of this invention to provide a method of making a composite metal base rotor blade having a modal frequency greater than that of a metallic blade of the same dimensions, configuration and base metal composition.

These and other objects are accomplished in accordance with a preferred embodiment of our invention by first providing a metallic blade member substantially in the configuration of the desired blade structure and then applying one or more thin sheet-like layers of parallel high modulus filaments in side-by-side parallel relationship bonded together with a suitable thermosetting synthetic resin and bonded to the fluid directing faces of the metallic blade member. Preferably, the filaments are of a material having a modulus of elasticity of at least about $40 \times 10^6$ p.s.i. By way of example, suitable high modulus materials available in filament form include tungsten wire core boron filaments, graphite filaments, and silicon carbide filaments. In general, the directional alignment of a given layer of bonded-together high modulus filaments is determined by the needs of the particular blade design. For example, if it has been analytically or experimentally established that a metallic blade design will mechanically fail because its bending modal vibration frequency is too low, the high modulus filaments are preferably aligned parallel to the longitudinal axis of the blade, which extends from a root to the tip thereof. This alignment stiffens the blade in the direction of its longitudinal axis and substantially increases the bending modal frequency of the resulting composite blade to a level above that of the frequency of exciting forces to be encountered. The alignment of the filaments in the stiffening layer with the longitudinal axis of the blade also tends to increase the damping characteristics of the composite blade with respect to torsional vibrations.

Alternatively, if the torsional vibration mode is found to be critical in a given blade design, the stiffening layer is preferably positioned on the blade surface and bonded thereto such that the filaments lie transverse with respect to the longitudinal axis of the blade. This has the effect of substantially increasing the torsional modal frequency of the composite structure. Various combinations of increases in modal frequencies and damping effects may be accomplished by providing a plurality of superimposed layers wherein the high modulus filaments in the respective layers are arranged at different angles with respect to the longitudinal axis, e.g. 0°, 45°, 135° and/or 90° to buttress and stiffen the metal blade member in the different directions. The result is a light weight composite blade which is actually stiffer with respect to cylical vibration exciting loads than would be an entirely metallic blade of the same configuration and dimensions as the composite structure. This is possible because the filament employed has a high modulus of elasticity, which is preferably $40 \times 10^6$ p.s.i. or greater.

Other objects and advantages of the present invention will become apparent from a detailed description thereof reference being made to the attached drawing in which:

FIGURE 1 is an elevation view of a rotor blade in accordance with our invention;

FIGURE 2 is a plan view of a rotor blade in accordance with our invention;

FIGURE 3 shows a sheet of resin bonded high modulus filaments cut into a form suitable for bonding to a metallic blade core;

FIGURES 4, 5 and 6 are, respectively, sheets as in FIGURE 3 which have been cut so that the filaments are arranged in different directions;

FIGURE 7 is an elevation view of a rotor blade having bonded thereto a plurality of superimposed sheets wherein the filaments of different sheets are aligned in varying directions.

For purposes of illustration, an embodiment of the invention will be described in which a tungsten core boron filament is employed. Such a filament is commercially available and is formed by deposting substantially pure boron onto a 0.005 inch diameter tungsten wire core until a composite filament having an overall diameter of about 0.0035 to 0.004 inch is obtained. This material has an average tensile strength of 400,000 p.s.i. and a modulus of elasticity of $55 \times 10^6$ p.s.i. It is to be understood that filaments of other materials may be employed so long as the filament has high modulus of elasticity, preferably at least about $40 \times 10^6$ p.s.i. For example, graphite filaments (modulus of elasticity about $40 \times 10^6$ p.s.i.) and silicon carbide filaments (modulus of elasticity about $65 \times 10^6$ p.s.i.) are both commercially available and may be used in accordance with the invention.

FIGURES 1 and 2 show a rotor blade indicated generally at 10 comprising an air foil section 12, a root section 14, and a tip 28. The root section 14 is dovetailed and adapted to be received by an axial slot in a rotor in the conventional manner. A locking slot 16 is cut out of root section 14 to retain blade 10 assembled within the axial slot of the rotor. The air foil section 12 has a generally convex fluid directing surface 18 and a generally concave fluid directing surface 20 which intersect at leading edge 22 and trailing edge 24. Molded to each of the fluid directing faces 18 and 20 is a thin coaing layer 26 of parallel tungsten wire core boron filaments in side-by-side relationship which are bonded together and to the metallic blade with a suitable thermosetting synthetic resin. The thickness of the coating is exaggerated as shown in FIGURE 2 for purposes of illustration. The spacing of the boron filaments is also exaggerated in all of the figures for the purpose of more clearly showing their alignment. Actually in accordance with the invention, it is preferred that the parallel filaments be in side-by-side relationship separated only by a thin film of bonding resin. In FIGURES 1 and 2 the stiffening coating 26 is aligned so that the boron filaments extend in the longitudinal direction of the blade, i.e. from the root 14 thereof to the tip 28. The reinforcing layer 26 which in general has a thickness of one boron filament plus suitable thermosetting bonding resin, covers the entire fluid directing surface of the air foil section. It is preferred that at least one resin bonded-filament layer e.g. FIGURES 1, 3 and 7, sheet 26 cover the entire surface to achieve the maximum increase in a modal vibration frequency. In general, a plurality of layers may be superimposed upon a fluid directing surface to achieve the desired blade stiffening effect. However, as more and more layers of the boron filament epoxy resin sheet are applied to the metal air foil member, the shape of the blade may be distorted somewhat from the desired aerodynamic configuration. Thus, it may be necessary to design the several reinforcing layers so that a suitable aerodynamic configuration is maintained as the thickness of the blade is increased. This may be done by the same techniques that are employed in designing a pattern for the blade in the first instance. FIGURES 4, 5 and 6 represent different sections which may be molded in superimposed relationship against the blade surface for the purpose of stiffening and at the same time maintaining preferred air foil configuration.

It is also noted in FIGURES 4 through 6 that the alignment of the parallel boron filaments in respective layers may be arranged to attain a desired result. In general, by aligning the boron filaments in the longitudinal axis of the blade, as shown in FIGURES 1 and 2, the modal frequency of the cantilever structure in the bending mode of vibration is substantially increased. There is little effect of the natural frequency of the torsional mode of vibration but there is a substantial increase in the damping of torsional vibrations. Conversely, if the filaments are aligned, as shown in the boron filament sheet 30 depicted in FIGURE 6, in a direction transverse (90°) to the longitudinal axis of the blade, the effect is to increase the torsional modal frequency and to dampen bending mode vibrations. Filament layers or sheets of different alignments as shown in FIGURES 3 through 6, may be combined in superimposed relationship so that the composite laminate structure provides strengthening in a number of directions so as to obtain a psuedoisotropic stiffening effect. Filament layer 32 (FIGURE 4) has the filaments arranged at an angle of 135° with respect to the longitudinal axis. Filament layer 34 (FIGURE 5) has filaments aligned at 45° with respect to the longitudinal axis of the blade. In FIGURE 7 is shown a blade 36, basically similar to blade 10 in FIGURES 1 and 2, with a plurality of superimposed thin reinforcing layers 26, 30, 32 and 34 wherein the filaments in the respective layers are aligned in varying directions on the surface. In the design of a given blade, or in the strengthening of an existing blade, analytical or experimental vibration analysis techniques may be employed to determine the particular manner in which a rotor blade need be stiffened. Once it has been determined which modal frequency must be increased or which damping characteristic should be increased, the tungsten wire core boron filament synthetic resin composite sheets may be cut out in a manner consistent with the above-defined rules.

In accordance with our invention, sheets of high modulus of elasticity filaments bonded together in side-by-side relationship with thermosetting resin may be prepared in advance, stored and then used as the need arises. We have prepared sheets of the strengthening material and applied them to turbine blades in the following manner. An aluminum cylindrical mandrel, approximately 24" in length and 12" in diameter is adapted to be supported at its axis and rotated by a lathe. The mandrel is covered with a layer of polyvinyl chloride film which is attached thereto with masking tape. In operation the mandrel is warmed with heat lamps to a temperature of about 95° F.

A suitable resin system employed to impregnate and bond the boron filament is formulated in the following manner: 100 parts by weight epoxy novalac resin (such as Dow Chemical, DEN 438) and 101 parts by weight Methyl Nadic Anhydride (a methylated maleic adduct of phthalic anhydride) curing agent are heated and mixed at 150° F. About 1.5 parts by weight tri-dimethylaminomethylphenol catalyst is added to the resin and curing agent and uniformly mixed therewith.

A spool of boron filament is mounted on a spindle. The filament is preferably 0.0035 to 0.004 inch OD with a 0.0005 inch tungsten core. It is commercially available with an average tensile strength of 400,000 p.s.i. and a modulus of elasticity of $55 \times 10^6$ p.s.i. Although this size tungsten core boron filament is preferred for use in accordance with the invention, slightly larger or smaller sizes are suitable. The filament is unwound from the spool and threaded through a cleaning tank containing toluene, and then subsequently threaded through a guide mounted on the lathe carriage. The end of the boron filament is taped to the polyvinyl chloride film near one end of the mandrel and at a slight angle thereto so that subsequent winds will not overlap this taped end of the wire. A thin coating of the resin formulation is brushed on the mandrel film from a point at the initial wire loop around the mandrel to a width slightly greater than the filament-resin tape to be wound. The lathe is started up to 18 revolutions per minute and the carriage travel is set to 0.0045 inch per revolution of the mandrel. The boron filament is thus played off of the spool, through the cleaning bath and onto the epoxy coated mandrel. The OD of the filament and the carriage travel per revolution of the mandrel are such that subsequent turns of the continuous boron filament are in close together side-by-side relationship with a thin film of thermosetting resin squeezed therebetween. The result is a composite boron filament-epoxy resin tape. When a tape of desired width has been wound upon the mandrel the lathe is stopped and the filament is cut and the filament end is secured with masking tape to the polyvinyl chloride film. The lathe is then restarted at low speed and a thin uniform coat of the resin formulation is subsequently brushed over the boron filaments. The lathe is stopped and the boron tape is immediately wrapped with a sheet of polyvinyl chloride film the ends of which are taped together with masking tape. The boron filament tape is removed from the mandrel by cutting with a knife completely through the tape-plastic film sandwich and across the width of the mandrel. The tape-film sandwich is stretched out flat from its original cylindrical configuration and secured to a rigid piece of plywood by clamping the ends securely thereto. This assembly is placed in an oven to cure the epoxy resin to the B-stage by heating therein for 50 minutes at about 165° F. The assembly is removed from the oven and if the tape is not to be used for fabrication is stored at −60° F. preferably in a sealed plastic bag.

In accordance with the invention the metallic portion of the air foil structure may be any metal suitable for forming a rotor blade. In general, however, it is expected that in the interests of decreasing the weight of the rotor structure, aluminum or titanium blades will be employed. The metallic blade member portion of the composite structure may be formed slightly under size so as to accommodate the stiffening boron-filament laminates. Alternatively, of course, an existing blade may be stiffened by application of the boron filament laminate thereto. For purposes of illustration the technique of applying the boron filament laminate to the metal blade member will be described in connection with aluminum alloy blades. A suitable aluminum alloy is 7178–T6 which is a precipitation hardened alloy nominally comprising by weight 6.8% zinc, 2.7% magnesium, 2.0% copper, 0.3% chrome and the balance aluminum. The air foil section of the conventionally formed aluminum alloy blade is sanded lightly to remove any slight protuberances on the blade surface. The blades are wiped thoroughly with methyl ethyl ketone to remove all foreign matter. The blades are then etched in a solution comprising by weight 100 parts sodium dichromate, 350 parts sulfuric acid, and 850 parts deionized water. The temperature of the bath is controlled at about 155° F. and the blades are etched for about 10 minutes. The blades are rinsed in water and dried. Preferably, the etched surface of the blade is not contacted with any other object or material until time of fabrication.

Aluminum reinforced epoxy resin molds are prepared to the configuration of the ultimate composite air foil section. The faces of the mold are cleaned with methyl ethyl ketone and a release solution comprised of 10 parts by weight silicone resin, 80 parts by weight isopropyl alcohol and 10 parts by weight toluene applied thereto. The mold is heated at 400° F. for four hours and then cooled to about 200° F. at which point it is ready for use in fabrication.

A pattern of both the concave and convex side of the blade is prepared. The boron filament epoxy resin tape prepared as described above is laid over the pattern, the direction of the boron filaments being aligned parallel to the longitudinal axis of the blade. The tape is trimmed around the pattern so that the cut out section will exactly cover the blade fluid directing surface when superimposed thereon. Two such sections are cut for both the convex and concave fluid directing surfaces. The cut filament epoxy layers are placed one on top of another on the air foil surface after which they were patterned. The blade with the two identical tapes on each surface was located within the mold and the mold closed. The mold is positioned in a suitable press and pressures applied thereto gradually to 200 p.s.i. The resin system is heated in the mold at 200° F. and 200 p.s.i. for one hour at which time the mold is removed from the press, opened and the composite blade removed. A thin coat of the resin formulation is brushed over the molded boron filament laminate and the blade was placed in the mold and cured for one hour at 200° F. and then one hour at 300° F. under 200 p.s.i. pressure. The blade is removed from the mold and the cure completed at 300° F. in a forced draft oven for two hours. The blades are then removed from the oven and allowed to cool to room temperature. Excess resin is trimmed from the blade edges and the root portion.

A composite blade so produced was subjected to vibrational testing along with an unreinforced aluminum blade member exactly like that used in the preparation of the composite blade, and a heavier aluminum blade of the same dimensions as the final composite blade. The following observations were made. The modal frequency in the first bending mode of the unreinforced aluminum alloy blade member was 225 cycles per second. The unreinforced aluminum blade exhibited 2.6% damping of first fundamental bending mode vibrations. The modal frequency of the first fundamental bending mode of the boron filament-epoxy resin reinforced aluminum blade was 331 cycles per second. Moreover, these blades exhibited 2.9% damping of the first bending mode. The heavy duty aluminum alloy (7178–T6) blade, identical in overall dimensions to the boron filament reinforced original aluminum blade displayed a modal frequency of 225 cycles per second in the first bending mode just as was observed in the original unsupported aluminum blade. Other vibration data were observed as follows:

| Blade Structure | Second Bending Mode | | Torsional Mode | |
| --- | --- | --- | --- | --- |
| | Modal Frequency | Percent Damping | Modal Frequency | Percent Damping |
| Aluminum original blade | 930 | 3.0 | 1,160 | 1.5 |
| Aluminum heavy blade | 1,030 | | 1,275 | |
| Boron filament-epoxy reinforced aluminum blade | 1,472 | 7.4 | 1,109 | 10.9 |

It is noted that with respect to the bending mode of vibration the modal frequency of the blade was substantially increased by the use of a boron filament laminate. This increase was far greater than that obtained by increasing the thickness of the unreinforced aluminum blade to the same dimensions as that resulting from the use of the laminate. The alignment of all the boron filaments with the longitudinal axis of the blade brought about a slight decrease in the torsional modal frequency. However, it is noted that there was a seven-fold increase in the damping characteristics of the reinforced blade with respect to torsional mode vibrations.

As indicated above, similar substantial increases in the torsional modal frequency and damping of bending mode vibration are obtained by applying the boron filament-thermosetting resin laminate at an angle of 90° with respect to the longitudinal axis of the blade. In some blade applications the exciting forces will be such that it will be preferred to apply and mold together a number of the boron filament laminate sheets, wherein the succeeding superimposed layers have filaments aligned at different angles, such as for example 0°, 45°, 135° and 90°, with respect to the longitudinal axis of the blade. These succeeding molded together layers cooperate to effectively stiffen the blade and increase the modal frequency irrespective of the modal vibration. These born filament laminates may also be cut so as to maintain the areodynamic configuration of the blade. This is accomplished just as pattern are made up for the blade in the first instance, by providing a number of profiles the outline of each representing an area of constant thickness in the cross section of the blade. The outer layers will become smaller in overall area as indicated by the change in shape of the layers depicted in FIGURES 3 through 6.

It is apparent that thermosetting resin other than epoxy resins may be employed in accordance with the invention, the selection being made primarily on the temperature at which the compressor blade is expected to operate. Epoxy resin systems are suitable for use in the first stages of compressor rotor blades. Subsequent stage composite rotor blades may employ a binder system based, for example, upon polyimide and polybenzimadazole resins which permit extended use of this type of composite structure to temperatures of 700° F. and intermittent use at 900° F. Of course, the processing temperatures and pressures employed in preparing the filament sheet will vary somewhat depending upon the resin that is used and the base metal employed. This is readily recognized by and compensated for by one skilled in the art.

Because of the relatively high modulus of elasticity (at least about $40 \times 10^6$ p.s.i.) of the filaments employed in accordance with the invention, the reinforcing laminates will stiffen any light weight turbine blade metal, such as for example titanium and titanium alloys, aluminum and aluminum alloys, and copper alloys such as brass and bronze. It is also useful in connection with steel blades.

Accordingly, while our invention has been described in terms of a preferred embodiment thereof, it will be appreciated that other forms can readily be adapted by one skilled in the art and therefore should be considered limited only by the scope of the following claims.

We claim:

1. A composite rotor blade comprising a metallic blade member and a stiffening coating layer on a surface of said blade member of high modulus of elasticity filaments bonded together in parallel side-by-side relationship, the orientation of said filaments being such that said coating increases a modal vibration frequency of said metal blade member, the value of said modulus of elasticity being at least about $40 \times 10^6$ p.s.i.

2. A composite rotor blade comprising a metal blade member having a generally convex fluid directing face and a generally concave fluid directing face, which faces intersect in a leading edge and a trailing edge, and at least one coating layer comprised of a plurality of high modulus filaments bonded together in parallel side-by-side relationship with a thermosetting synthetic resin on each of said fluid directing faces, said parallel filaments having a modulus of elasticity of at least about $40 \times 10^6$ p.s.i. and being oriented in a direction whereby said coating layers cooperate to increase a modal vibration frequency of said metal blade member.

3. A rotor blade comprising a metallic blade member having a generally convex fluid directing face and a generally concave fluid directing face, which faces intersect in a leading edge and a trailing edge, and a plurality of superimposed lamellar coating layers on each of said fluid directing faces, each of said layers being comprised of tungsten core-boron filaments bonded together in parallel side-by-side relationship with a thermosetting synthetic resin, said metallic blade member being formed of a metal taken from the group consisting of aluminum, aluminum alloys, titanium and titanium alloys, and said boron filaments being oriented whereby said coating layers effectively increase a modal vibration frequency of said metallic blade member.

4. A rotor blade comprising a metallic blade member having two fluid directing faces, a root portion, a tip portion, and a plurality of lamellar coating layers on each of said fluid directing faces, said coating layers being comprised of a plurality of tungsten core-boron filaments bonded together in a parallel side-by-side relationship with a thermosetting synthetic resin, the boron filaments in at least one of said lamellar layers being aligned parallel to the axis of said blade extending from the root to the tip thereof and the boron filaments in another of said lamellar layers being aligned in a direction which is not parallel to said axis whereby said coating layers effectively increase modal vibration frequencies of said composite blade.

5. A method of preparing a composite rotor blade having a high modal vibration frequency comprising the steps of providing a metallic blade member having two fluid directing faces which intersect at a leading edge and a trailing edge, placing a plurality of thermosetting resin impregnated high modulus filaments in parallel side-by-side relationship, said filaments having a modulus of elasticity of at least about $40 \times 10^6$ p.s.i., partially curing said resin so as to form a sheet of said filaments, cutting a section of filaments from said sheet of configuration which will fit against a said fluid directing surface without overhang and molding said section against a said fluid directing face at suitable high temperature and pressure to cure said resin whereby each of said filaments is bonded to the adjoining filament in said sheet and said section of said sheet is bonded to said fluid directing face, said filaments being oriented in a direction whereby a modal vibration frequency of said metallic blade member is increased.

References Cited

UNITED STATES PATENTS

| 2,775,426 | 12/1956 | Barrett et al. | |
| 2,920,868 | 1/1960 | Ackerman et al. | 253—77 |
| 3,301,530 | 1/1967 | Lull | 170—159 X |

FOREIGN PATENTS 787,500  12/1957  Great Britain.

EVERETTE A. POWELL, JR., *Primary Examiner.*